March 3, 1959  L. WATAMAKER  2,875,568
HARVESTING MACHINE AND ATTACHMENT THEREFOR
Filed Feb. 23, 1954

INVENTOR.
LOUIS WATAMAKER
BY
Gregory S. Dolgorukov
ATTORNEY.

United States Patent Office 2,875,568
Patented Mar. 3, 1959

2,875,568

HARVESTING MACHINE AND ATTACHMENT THEREFOR

Louis Watamaker, Detroit, Mich.

Application February 23, 1954, Serial No. 411,712

2 Claims. (Cl. 56—210)

This invention relates to harvesting machines and more particularly to an improved machine for harvesting cultivated row crops, such as soy beans.

Great difficulties have been encountered in harvesting cultivated row crops, and particularly soy beans, with the aid of existing harvesting machines or combines. A field having raised thereon a cultivated row crop is not level but has ridges provided thereon with the aid of cultivators, with the distances between the ridges varying, depending upon the particular crop. In cases of soy beans, the rows of soy beans are planted approximately 28" apart. The hills or ridges provided with the cultivators are at the stalks of the plants, with furrows resulting from taking earth for the hills being thus formed between the rows of such plants.

Cultivated row crops, such as soy beans, have to be cut very low or close to the ground, such as 2" or 3" therefrom, since the bean pods start from that height on the plant stalks. Unless all pods are cut off, part of the crop is wasted. Being left in the field, it may seed itself and come up next year, interfering with the next year's crop. In some cases, such as with oats, such interference may be very serious. When the ripe and dry oats are ready to be cut, the soy beans stalks are still green and moist, and, therefore, they greatly interfere with threshing and with subsequent storing of the grain.

In view of the above, where harvesting machines or combines are used for harvesting soy beans row crops, the saw type knife, or "sickle" as it is called in that particular art, must pass at the height of approximately 2"-3" from the tops of the cultivated hills, in order to cut the crop clean. However, cutting soy bean crops so low involves serious danger to conventional harvesting machines and combines. The sickle is carried by the header which in turn, is supported by the wheels. Although the header and, therefore, the sickle are adjustable as to their height, the adjustment devices are such that after an adjustment is effected, the sickle is connected to the supporting wheels positively. Therefore, if one of the wheels runs into a rut or furrow and the other wheel gets on a hill, one end of the sickle may cut too high, while the other end thereof may cut off the top of a hill sending into the header and threshing drum a quantity of earth and pebbles.

Getting the sickle into the ground in such a manner not only dulls the sickle but greatly endangers the threshing drum by sending thereinto the earth and pebbles. Clearances within the threshing drum are only ½" and even less. Therefore, a pebble of 1" in size may cause serious danger to the machine. It should be appreciated that breakage of a combine in the field during the time of harvesting which, due to uncertainity of weather may be very short, may cause a loss which is not measured by the repair bill for damage to the machine, but also by having a large and expensive machine become idle in the field for considerable length of time, and by the loss of valuable time available for harvesting.

It should be distinctly understood that guards on the sickle, as well as guard type skids at the sides of the header, may roll off a large stone or even stop the machine at a serious obstruction, do not in any way eliminate the above described danger, since they do not prevent the sickle from cutting off tops of the cultivated hills. In view of the above, cutting of soy bean crops has been done at a much greater height than otherwise desirable, usually leaving several pods on many stalks, thus causing waste of a considerable portion of the crop and causing re-seeding of soy beans or another crop with the next year's crop and the difficulties resulting therefrom. In many instances, when raising soy bean crops, cultivation thereof is avoided in view of the difficulties explained above, and this fact may mean improper raising of the crop from the standpoint of its maximum yield, and considerable waste usually due to the weeds interfering with the crop.

One of the objects of the present invention is to provide an improved harvesting machine or combine whereby the above difficulties and disadvantages are overcome and largely eliminated.

Another object of the present invention is to provide an improved harvesting machine or combine particularly advantageous in harvesting cultivated row crops, particularly soy bean crops, means being provided whereby the sickle of the machine is made to cut below the height where the pods occurs on the stalks and yet not present danger of cutting off stops of cultivated hills when the wheels of the machine run up a hill on one side of the machine and into a rut or furrow on the other.

Another object of the present invention is to provide a harvesting machine of the above nature in which the height of cutting may be adjusted to suit a particular condition.

A still further object of the present invention is to provide a simple and inexpensive attachment for a harvesting machine, which attachment can be provided in a new machine at the time of making the same, or be attached to a machine already in the field, and eliminate the difficulties and disadvantages explained above.

A still further object of the present invention is to provide an improved attachment for a harvesting machine, which can be manufactured and sold as a separate attachment or separate piece of optional equipment and thus constitute a definite article of manufacture in this particular trade.

It is an added object of the present invention to provide an improved device of the foregoing nature which is simple and rugged in construction, dependable in operation, is easy to install and service, and is relatively inexpensive to manufacture.

Further objects and advantages of this invention will be apparent from the following description and appended claims, reference being had to the accompanying drawings forming a part of this specification wherein like reference characters designate corresponding parts in the several views.

Figure 1:
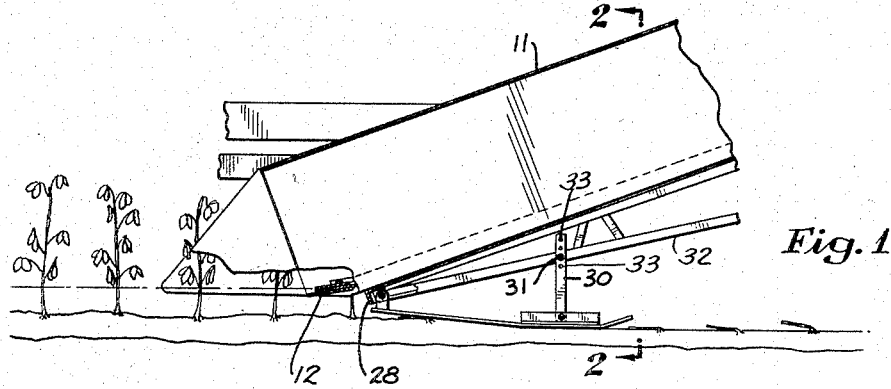
Fig. 1 is a side view showing a portion of a harvester header, with the side thereof being broken away to expose the knife or sickle, embodying the present invention.
Figure 2:
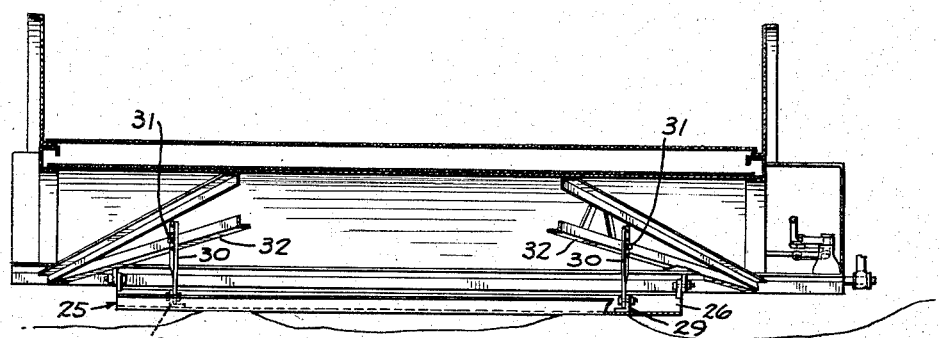
Fig. 2 is a rear view of the construction of Fig. 1, illustrating relationship of the floating header and the skid provided thereon in accordance with the invention to the cultivated hills.
Figure 3:
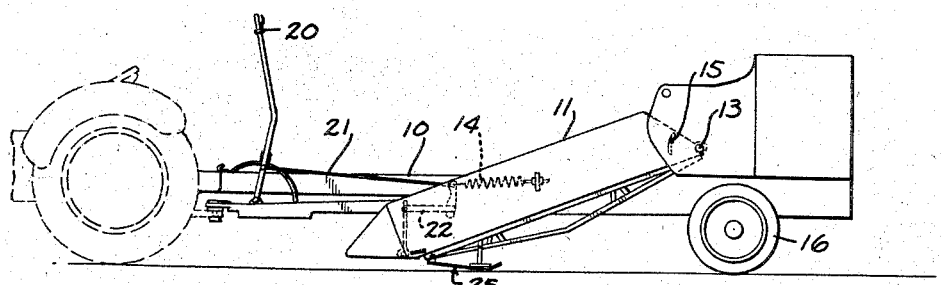
Fig. 3 is a side view on a smaller scale, showing a substantial portion of a harvesting machine hitched to a tractor and embodying the present invention, and illustrating the floating suspension of the header thereon.
Figure 4:
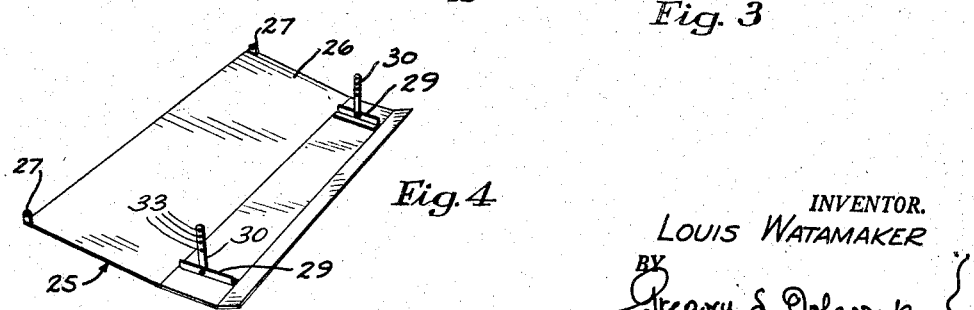
Fig. 4 is a perspective view showing separately the skid which controls the floating header provided on the harvesting machine in accordance with the invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention I discard the conventional construction of a harvesting machine in which the header is carried by the machine in fixed adjustable relationship to the wheels of the machine. In accordance with the invention I provide a harvesting machine having a header floatingly carried by the machine during the cutting operation, and, therefore, free to move with respect to the wheels of the machine. Furthermore, I provide on the header rearwardly of the sickle a skid of a unitary construction with the total area of the skid device being relatively large and adapted to support the header at a predetermined height by virtue of the skid device running along the tops of the cultivated rows. The skid device extends along the sickle, i. e., transversely of the header for a distance sufficient to bridge the space between the two adjacent cultivated row hills and to overhang on both outer sides of such adjacent hills for a sufficient distance to remain on such hills irrespective of the fact that the wheels of the machine may run slightly to one side or the other during the cutting operation. I provide adjustment means whereby the lowermost portion of the sickle may be adjusted to meet various conditions. In operation, the large area skid always runs behind a sickle and supports the same at a predetermined height from the tops of the cultivated hills, said distance being selected to have the sickle cut off the stalks below the bean pods but not to touch the ground. In other words, in my improved harvesting machine, the header instead of being rigid with the machine and rolling on the wheels which run in the spaces between the hills, is floating with respect to the machine and is dragged in cutting over the tops of the hills on a long and wide sheet metal skid running over the stubble. When one or both wheels of the machine run into a rut, they move down with respect to the header but do not carry the header with them. The header, being supported at its sickle end by the skid, still remains to have the sickle cut at such predetermined height or distance from the hill tops until the wheels run out of the low spots.

My improved skid may be incorporated in original equipment or be made in the form of a separate attachment installable in machines already in the field. For installation of the attachment, means securing the header to the wheels at a predetermined elevation have to be modified or completely taken off, in order to release the header for floating movements during cutting operations. I prefer to effect the necessary modification by plugging the holes of the adjustment device of the hole-and-pin type, or by tying the spring control latch on such device of the latch-and-notch type.

While the present invention is hereinafter illustrated and described with reference to cultivated crops, it will be understood that under certain conditions it may be applied with advantage to non-cultivated crops, such as soy beans sowed solid, or crops such as clover which have to be cut very low.

Referring to the drawings, there is shown therein, by way of example, a harvesting machine embodying the present invention. The harvesting machine illustrated in the drawings includes a frame 10 on which there is angularly mounted a header, generally indicated by the numeral 11 and having a sickle 12 provided thereon in a manner well known in the art. The head 11 is pivotally mounted on the machine structure as shown at 13, a counter-balancing spring 14 being provided to support a large portion of the weight of the header 11. A pin-and-slot device generally indicated by the numeral 15 determines the extremities of the pivotal movements of the header 11. It will now be seen in view of the foregoing that with such a construction the header 11 is floatingly supported with respect to the machine wheels 16. In my improved machine, the elevation control means including a handle 20 pivotally mounted on the structure of the machine and connected with the aid of a tie 21 and a crank 22 with the header 11, are of such a construction that they do not interfere with the floating movements of the header 11. In my improved construction the elevation control is used primarily for raising the header to an inoperative height for moving the machine from one place to another, and for raising the header in an emergency during cutting operations. To the underside reinforcing structure of the header there is secured a sheet metal skid generally indicated by the numeral 25, said skid comprising a large area of metal sheet 26 approximately ⅛" in thickness and bent to impart to it a necessary curvature. At the front corner of the sheet 26 there are provided ears 27 by which the skid is pivotally connected to the front angular member 28 of the header. Near the rear edge of the sheet 26 there are provided supporting brackets 29 welded or otherwise secured to the sheet 26 and having upward extensions 30 provided with a number of holes 33 adapted to receive suitable pins 31 adapted to be passed through said holes 33 and the holes in the angular members 32 for securing the skid 25 to the header 11. By the provision of plurality of holes 33 on said extensions 30, the skid 25 may be raised or lowered in order to lower or to raise the sickle with respect to the bottom of the skid.

It will now be seen in view of the foregoing that the skid 25 is thus rigidly connected to the header, but with the header 11 being free to move with respect to the supporting wheels, the sickle 12 of the machine is floatingly supported during cutting operation, and its elevation with respect to tops of the hills is controlled not by the ground over which the supporting wheels such as 16 and 17 run, but by the tops of the cultivated hills. Since the bean pods grow on the bean stalks at a certain distance from the earth line, in harvesting with the use of my improved machine the stalks are cut with relation to such pods and not with relation to the ground between the cultivated hills over which the supporting wheels run and which has no direct relation with the elevation of the pods on the stalks.

It is important that the length of the sheet 26 is so selected that the skid extends along the sickle or transversely of the header for a distance sufficient to bridge the distance between at least two cultivated hills and overhangs on their outer sides for a sufficient distance to prevent the skid from running off such hills in practical operation of the machine. It will be understood, however, that much longer skids bridging three or more rows of cultivated rows of crops may also be used.

It will now be seen in view of the foregoing that in cutting operations the skid always runs on at least two hills and will not permit the sickle to touch the ground. Thus, the danger of the sickle cutting off tops of the hills and passing earth and pebbles into the threshing drum is eliminated. As a result thereof, harvesting operation of cultivated row crops and particularly soy beans can now be carried on much faster, with much less nervous strain on the operator, and without stoppages occurring with the use of conventional harvesting machines and often accompanied by breakage and damage to the machine, which may result from cutting off hill tops.

Moreover, provision of my improved harvesting machine encourages cultivation of the row crops and raising them properly without weed interference, thus ensuring maximum yields and elimination of many difficulties now considered unavoidable in harvesting such crops. Thus, provision of my improved harvesting machine encourages proper and more profitable cultivation of such crops, and more efficient and profitable use of the land. The simplicity of the construction of my skid device and ease of its installation and maintenance make its cost negligible compared with the advantages thus achieved and savings made possible therewith.

My improved skid device may be sold as a separate attachment, as mentioned above.

By the provision of the improved construction described above, the difficulties and disadvantages of the prior art explained above are overcome and largely eliminated, and the objects of the present invention listed above and numerous additional advantages are attained.

I claim:

1. In a machine for harvesting cultivated row crops and including a frame structure supported on wheels, a header having a sickle at one end and being pivotally mounted at the other end on said structure, providing for up and down floating movements of said header with respect to the frame, and a wide metal apron mounted on the underside of said header remote from said frame adjacent the sickle and extending substantially throughout the entire width of said sickle, whereby in operation of the machine the apron rides over and is supported by the tops of at least two cultivated rows of earth without sinking into the same or into the ruts between the cultivated rows and thus causes the sickle to maintain its position floatingly with respect to the tops of the cultivated rows rather than with respect to the wheels or to the ground over which the wheels run.

2. The construction defined in claim 1 with the wide metal apron mounted on the header including means for being adjusted in the upward and downward direction with respect to the sickle.

References Cited in the file of this patent
UNITED STATES PATENTS

| | | |
|---|---|---|
| 1,073,819 | Rice | Sept. 23, 1913 |
| 2,298,121 | Grimes | Oct. 6, 1942 |
| 2,352,257 | Dray | June 27, 1944 |
| 2,426,922 | Carroll | Sept. 2, 1947 |
| 2,515,556 | Hartling | July 18, 1950 |